(12) United States Patent
Mimberg

(10) Patent No.: US 8,417,980 B1
(45) Date of Patent: Apr. 9, 2013

(54) DUAL-MODE POWER SUPPLY

(75) Inventor: Ludger Mimberg, Baesweiler (DE)

(73) Assignee: Nvidia Corporation, Santa Clara, CA (US)

( * ) Notice: Subject to any disclaimer, the term of this patent is extended or adjusted under 35 U.S.C. 154(b) by 1266 days.

(21) Appl. No.: 12/194,499

(22) Filed: Aug. 19, 2008

(51) Int. Cl.
- *G06F 1/00* (2006.01)
- *G05F 1/10* (2006.01)
- *G05F 1/00* (2006.01)
- *H02J 3/12* (2006.01)
- *H02M 3/335* (2006.01)

(52) U.S. Cl.
USPC ........... 713/330; 713/300; 323/234; 323/266; 363/21.01

(58) Field of Classification Search ................. 713/300, 713/323, 330; 324/234, 266; 363/21.01; 323/234, 266
See application file for complete search history.

(56) References Cited

U.S. PATENT DOCUMENTS

| | | | |
|---|---|---|---|
| 2002/0046354 A1* | 4/2002 | Ostrom et al. ................ | 713/300 |
| 2003/0006650 A1* | 1/2003 | Tang et al. ..................... | 307/43 |
| 2003/0009702 A1* | 1/2003 | Park ............................... | 713/300 |
| 2003/0202366 A1* | 10/2003 | Kates .............................. | 363/65 |
| 2008/0018402 A1* | 1/2008 | Vogman ......................... | 330/256 |
| 2008/0232141 A1* | 9/2008 | Artusi et al. ................ | 363/21.01 |
| 2009/0089600 A1* | 4/2009 | Nousiainen .................... | 713/323 |
| 2009/0206804 A1* | 8/2009 | Xu et al. ........................ | 323/234 |
| 2009/0253495 A1* | 10/2009 | Loose et al. .................... | 463/25 |

* cited by examiner

*Primary Examiner* — Kim Huynh
*Assistant Examiner* — Brandon Kinsey
(74) *Attorney, Agent, or Firm* — Patterson & Sheridan, LLP

(57) ABSTRACT

A power supply connected to an electrical load that supplies an output voltage to the electrical load. The power supply includes a first portion having a fast transient response topology that supplies a first part of an output current, and a second portion having a slow transient response topology that supplies a second part of the output current, such that the second part of the output current does not increase or decrease as fast as the first part of the output current. Advantageously, embodiments of the invention provide a more efficient power supply design that converts part of the total power supply output current using a fast transient response portion and part using a slow transient response portion of the power supply. Additionally, embodiments of the invention provide an alternate current path for transporting large amounts of current to a GPU, while maintaining the efficiency of the overall current path.

18 Claims, 10 Drawing Sheets

DUAL-MODE POWER SUPPLY

BACKGROUND

1. Field of the Invention

The present invention relates to the field of power supplies and, in particular, to a dual-mode power supply.

2. Description of the Related Art

Efficiently supplying power to the various electrical loads within a computing device has proven to be challenging. In general, power from a wall outlet is converted in the "silver box" and is delivered to devices within the computer at an industry-standard 12 Volt (V) direct current (DC) power rail. The power is then converted locally at each device from 12V DC to a voltage level that is useful for the device, for example, 1.0V, 3.3V, or 5.1V.

One device within a computer that receives this standard 12V power is a graphics add-in card that typically includes at least one graphics processing unit (GPU). The 12V power is converted locally using a graphics card power supply. However, designers of graphics card power supplies are faced with unique challenges related to power conversion and power transport.

Two specific power conversion challenges are known as the load step and the load release problems. A load step is categorized by a load that changes very quickly from idle to full-power. A load release is categorized by an opposite load change. GPUs often exhibit load step and load release events when users of the computer toggle between a three-dimensional (3D) game that requires high-definition (HD) graphics processing to be performed by the GPU and a GPU-idle condition, such as browsing the web or checking e-mail. For these reasons, GPU power supplies must have a fast transient response to handle these step-like changes in load.

As is known, the time needed to complete the transient portion of a response is based on the level of inductance of the inductor within the power supply. The level of inductance limits the rate of current change, so a fast-switching power supply (e.g., a power supply with a fast transient response) usually has an inductor with a relatively small inductance (e.g., 120-150 nH). On the other hand, overshoot events, characterized by current spikes to high levels for short periods of time, militate for using inductors with larger inductances. Within GPUs, overshoot events occur because GPUs exhibit frequent load release events. For example, if the output voltage is 1.0V, then a difference of 11V is realized between the input voltage (12V) and the output voltage (1V). The 11V drop helps to get current into the inductor on a load step. However, when the load is released, there is only 1V of output voltage to deplete the energy from the inductor, causing an overshoot event. Each time that the load is released, over the course of several months or years of frequent overshoot events, there may be a small amount of GPU degradation. Over time, these small degradations may cause the device to fail. Therefore, in GPU designs, there is an optimization problem when determining the proper switching frequency, inductor and capacitor values, area requirements, and dynamic load capabilities.

Power transport challenges typically relate to transporting power from the graphics card power supply located on the add-in card to the GPU itself. The GPU is typically placed somewhere near the center of the add-in card and can be surrounded on three sides by memory interfaces and on the fourth side by peripheral interfaces, e.g., Peripheral Component Interconnect Express (PCIe) and other interfaces. The power supply is generally placed to one end of the add-in card (away from the GPU) to lessen the amount of electromagnetic noise affecting the analog circuit around the GPU interfaces. Because of the memory and other interfaces surrounding the GPU, there simply is not sufficient space around the GPU for power transport connections. In many prior art configurations, then, power is supplied through the printed circuit board (PCB) over one or more copper layers of the PCB. However, with current requirements for GPUs exceeding 250 Amperes (A), a large amount of copper is used to transport the current to the GPU through layers of the PCB. As current requirements continue to rise, it is becoming increasing more evident that supplying the power through the PCB is not a viable solution.

Some conventional power supply designs utilize multiple phases to convert the power. Each phase of the power supply may work in parallel with other phases to convert power. In most cases, those chips will go into a server/client mode and become a "normal" multiphase power supply. As is known, components of a power supply are getting too big, and using multiple phases allows designers to maintain higher switching frequencies with components that are not overly expensive. For example, in a GPU that is operating at 250 A, a typical arrangement may utilize approximately six to eight phases. In conventional systems, each phase of the power supply is built using a fast-switching topology, which is a relatively small design because of the relatively small inductor within each phase. The advantage of using multiple phases in a power supply design, where each phase is fast-switching, is that the power supply is able to handle the load step and load release events quickly. However, fast-switching phase topologies are inefficient.

To overcome the efficiency problems with a fast-switching multi-phase design, designers have implemented multi-stage phases for power conversion. The first stage converts the voltage from the original input voltage to an intermediate voltage; for example, from 12V to 5V. Then, the second stage converts power from the intermediate voltage to the final output voltage. In one prior art design, the first stage may be a high-efficiency, slow-switching stage, and the second stage may be a low-efficiency, fast-switching stage. The two-stage design has a generally fast-transient response because the second stage is implemented using a fast-switching topology. Additionally, because the second stage operates from lower input voltages (e.g., 5V instead of 12V), the two-stage design has higher efficiency than a single-stage topology and can use smaller, less lossy transistors. A larger duty cycle and high frequency of a two-stage design allows for lower overshoot problems. However, the two-stage design has inherent drawbacks. Importantly, the design requires a relatively large amount of space since the entire current is converted in both stages. Thus, all the power paths carry all of the current, regardless of how much efficiency and what dynamics are needed.

As the foregoing illustrates, there is a need in the art for an improved power supply design.

SUMMARY

Embodiments of the invention provide a power supply connected to an electrical load that supplies an output voltage to the electrical load. The power supply includes a first portion having a fast transient response topology that supplies a first part of an output current, where the first portion is capable of increasing the first part of the output current based on a load step event and decreasing the first part of the output current based on a load release event The power supply includes a second portion having a slow transient response topology that supplies a second part of the output current, such that the second part of the output current does not increase or decrease as fast as the first part of the output current.

Advantageously, embodiments of the invention provide a more efficient power supply design that converts part of the total power supply output current using a fast transient response portion and part using a slow transient response portion of the power supply. Additionally, embodiments of the invention provide an alternate current path for transporting large amounts of current to a GPU, while maintaining the efficiency of the overall current path.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
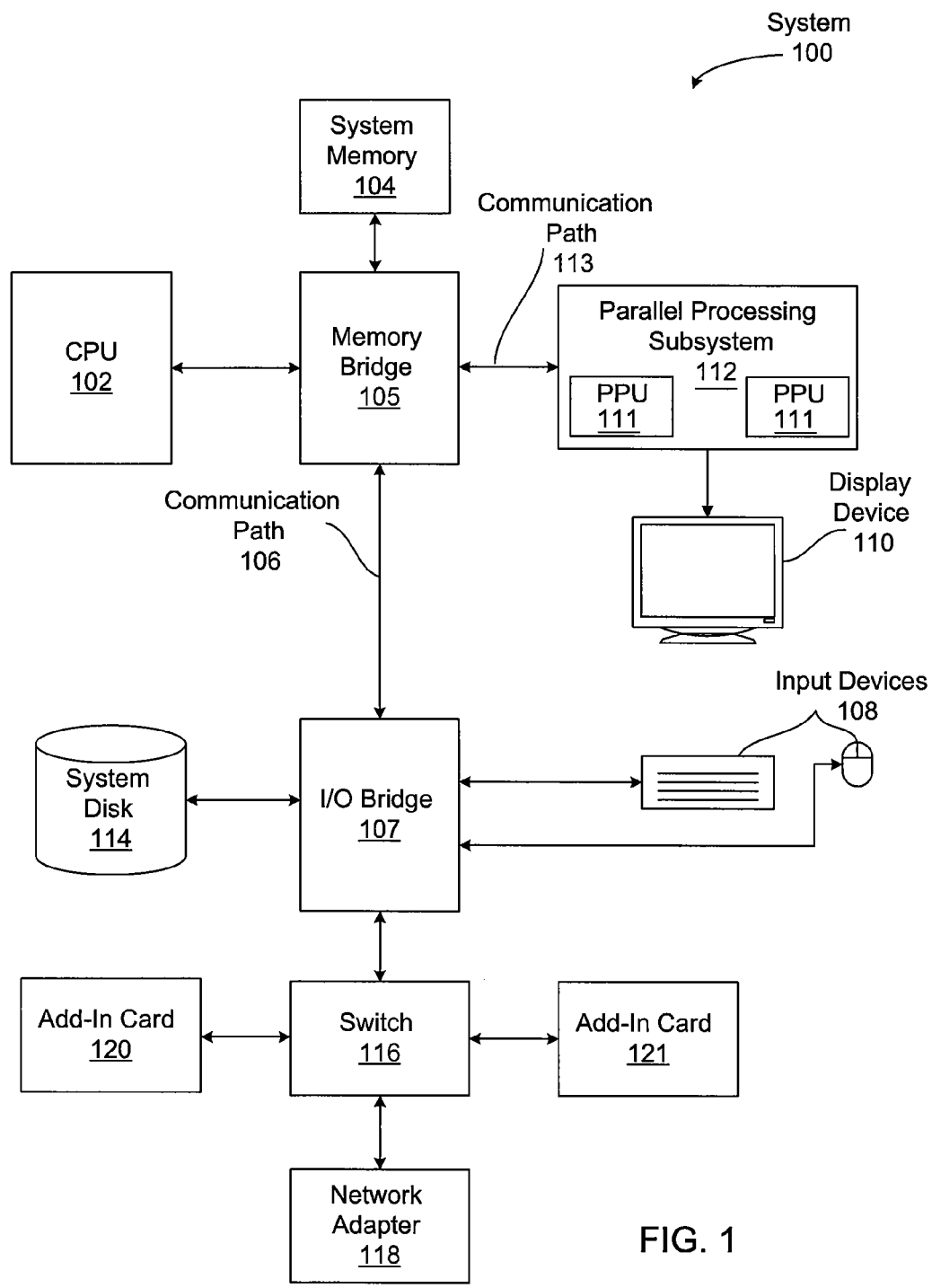
FIG. 1 is a block diagram of a system configured to implement one or more aspects of the present invention.

FIG. 1 is a block diagram of a system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, parallel processing subsystem 112 may include multiple parallel processing units (PPUs) 111 that include graphics processors with rendering pipelines that can be configured to perform various tasks related to generating pixel data from graphics data supplied by CPU 102 and/or system memory 104 via memory bridge 105 and bus 113, interacting with local memory of the parallel processing subsystem 112 (which can be used as graphics memory including, e.g., a conventional frame buffer) to store and update pixel data, delivering pixel data to display device 110, and the like. In some embodiments, parallel processing subsystem 112 may include one or more PPUs 111 that operate as graphics processors and one or more other PPUs 111 that are used for general-purpose computations. The PPUs 111 may be identical or different, and each PPU 111 may have its own dedicated memory device(s) or no dedicated memory device(s).

In operation, CPU 102 is the master processor of system 100, controlling and coordinating operations of other system components. In particular, CPU 102 issues commands that control the operation of PPUs 111. In some embodiments, CPU 102 writes a stream of commands for each PPU 111 to a pushbuffer (not shown in FIG. 1), which may be located in system memory 104, local memory of the parallel processing subsystem 112, or another storage location accessible to both CPU 102 and PPU. PPU 111 reads the command stream from the pushbuffer and executes commands asynchronously with operation of CPU 102.

A PPU 111 may be provided with any amount of local memory, including no local memory, and may use local memory and system memory in any combination. For instance, a PPU 111 can be a graphics processor in a unified memory architecture (UMA) embodiment. In such embodiments, little or no dedicated graphics memory is provided, and PPU 111 would use system memory exclusively or almost exclusively. In UMA embodiments, a PPU 111 may be integrated into a bridge chip or processor chip or provided as a discrete chip with a high-speed link (e.g., PCI-E) connecting the PPU 111 to system memory 104, e.g., via a bridge chip.

As noted above, any number of PPUs 111 can be included in a parallel processing subsystem 112. For instance, multiple PPUs 111 can be provided on a single add-in card, or multiple add-in cards can be connected to communication path 113, or one or more of the PPUs 111 could be integrated into a bridge chip. The PPUs 111 in a multi-PPU system may be identical to or different from each other; for instance, different PPUs 111 might have different numbers of cores, different amounts of local parallel processing memory, and so on. Where multiple PPUs 111 are present, they may be operated in parallel to process data at higher throughput than is possible with a single PPU.

Systems incorporating one or more PPUs 111 may be implemented in a variety of configurations and form factors, including desktop, laptop, or handheld personal computers, servers, workstations, game consoles, embedded systems, and so on.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Additionally, the connection of a PPU 111 within the parallel processing subsystem 112 to the rest of system 100 may also be varied. In some embodiments, parallel processing subsystem 112 is implemented as an add-in card that can be inserted into an expansion slot of system 100. In other embodiments, a PPU 111 can be integrated on a single chip with a bus bridge, such as memory bridge 105 or I/O bridge 107. In alternative embodiments that PPU 111 is a graphics processing unit (GPU) that can be integrated into the system 100 or on a separate add-in card. In still other embodiments, some or all elements of a PPU 111 may be integrated on a single chip with the CPU 102.

Figure 2:
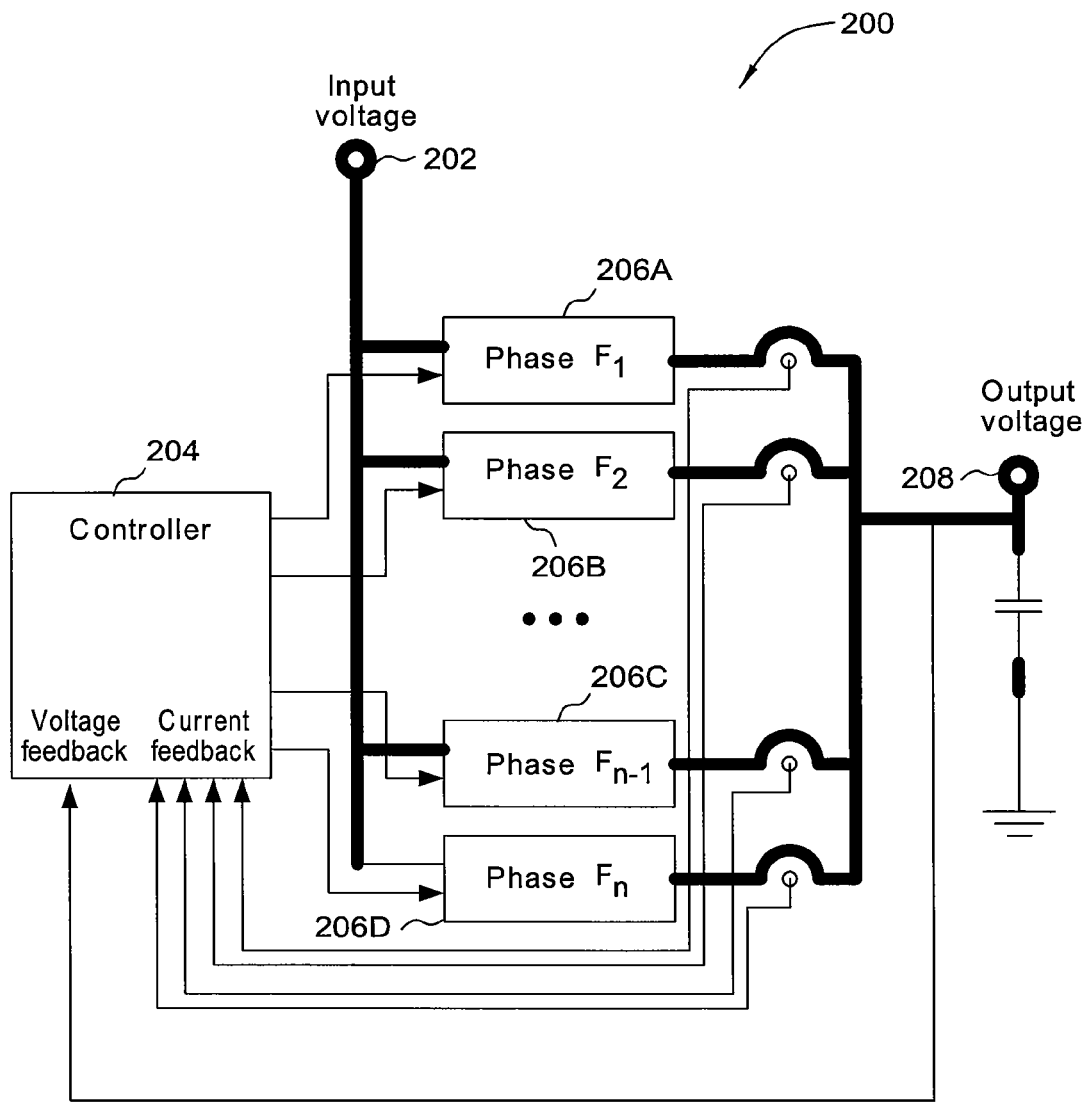
FIG. 2 is a conceptual diagram of a multi-phase power supply, according to the prior art.

FIG. 2 is a conceptual diagram of a multi-phase power supply 200, according to the prior art. As shown, phases 206A-206D convert an input voltage 202 to an output voltage 208 in parallel. Each phase of the prior art design is of the same topology—a fast-switching low-efficiency topology. The current carried through each phase is approximately equal for each phase. To stabilize the output voltage, current feedback for each phase and voltage feedback is returned to controller 204. The controller senses the current and voltage feedbacks and makes proper adjustments to maintain the output voltage 208.

Figure 3A:
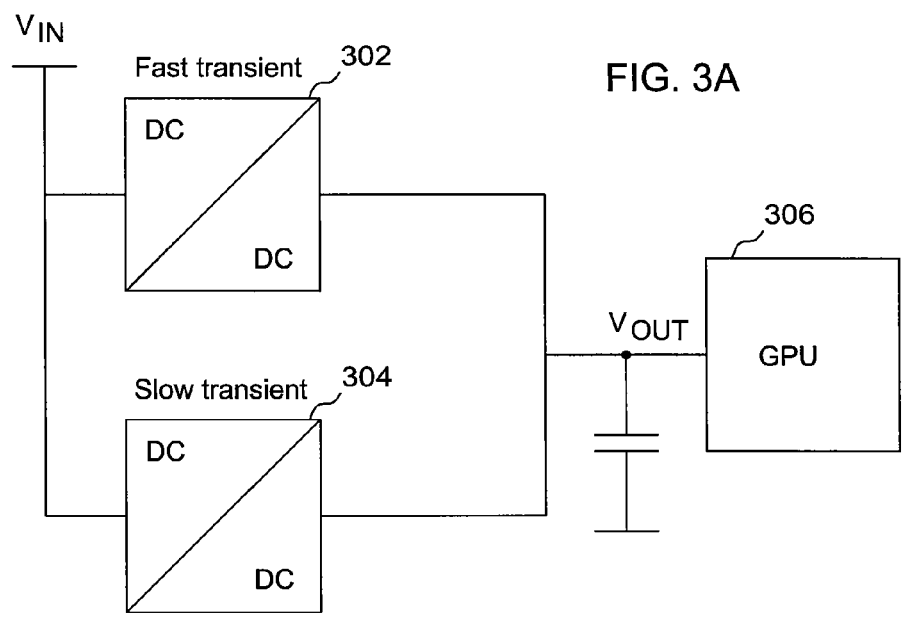
FIGS. 3A and 3B are conceptual diagrams of a dual-mode power supply configuration, according to embodiments of the invention.

FIG. 3A is a conceptual diagram of a dual-mode power supply configuration, according to one embodiment of the invention. A fast-transient portion 302 and a slow-transient portion 304 are used to supply the power to the load 306. As shown, the load 306 may be a GPU, but may also be any electrical load. In one embodiment, the fast-transient portion 302 may include multiple phases, where each phase constitutes a fast-switching topology. The slow-transient portion 304 may also include multiple phases, but each phase constitutes a high-efficiency, slow-switching topology. For example, the fast switching portion 302 may include phases that respond to a load step or load release event by adjusting a first part of the output current at a rate of approximately 1.5 A/ns on a load step of 70 A.

Most contemporaneous GPU designs include a greater proportion of leakage current relative to the total current supplied to the GPU. For example, in a typical high-performance GPU, approximately half of the total current could be used as leakage current. The amount of leakage current in a GPU is affected by the GPU supply voltage and temperature, both of which are slow-changing parameters. Consequently, since the leakage current changes slowly, there is no need to provide the leakage current with a fast-switching topology. Therefore, embodiments of the invention provide a technique for supplying the fast transient portions of the power supply current (the "dynamic current") using a fast-switching topology 302 and the slow transient portions of the power supply current (the "leakage current") using a slow-switching topology 304.

Figure 3B:
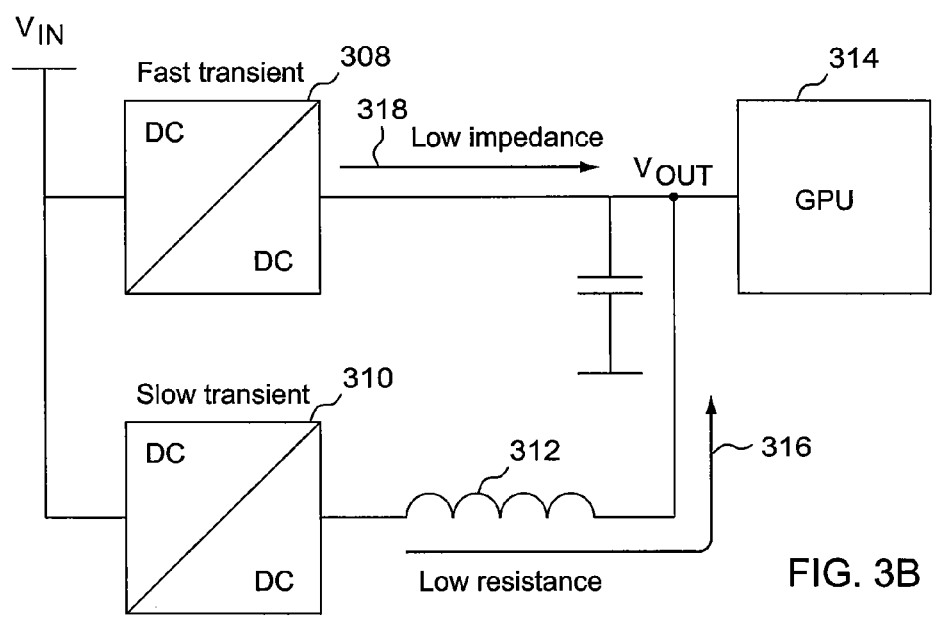

FIG. 3B is a conceptual diagram of a dual-mode power supply configuration, according to one embodiment of the invention. As shown, an inductor 312 is included in the current path 316 between the slow-transient portion 310 of the power supply and the load 314. In one embodiment, the current path 318 between the fast-transient portion 308 and the load 314 may be a low impedance current path, and the current path 316 between the slow-transient portion and the load 314 may be a low-resistance current path. As described above, the inductor 312 is a representation of a more inductive power path 316. It is acceptable to have such a path 316 in this part of the design, since the current from the slow transient portion 310 is only changing slowly. So, having an inductive path 316 is not a disadvantage.

In one embodiment, the fast-transient portion 308 and the slow-transient portion 310 may each supply half of the total current to the load 314. In alternative embodiments, the proportion of the current that is supplied by the fast-transient portion 308 and the slow-transient portion 310 may be programmable.

Figure 4A:
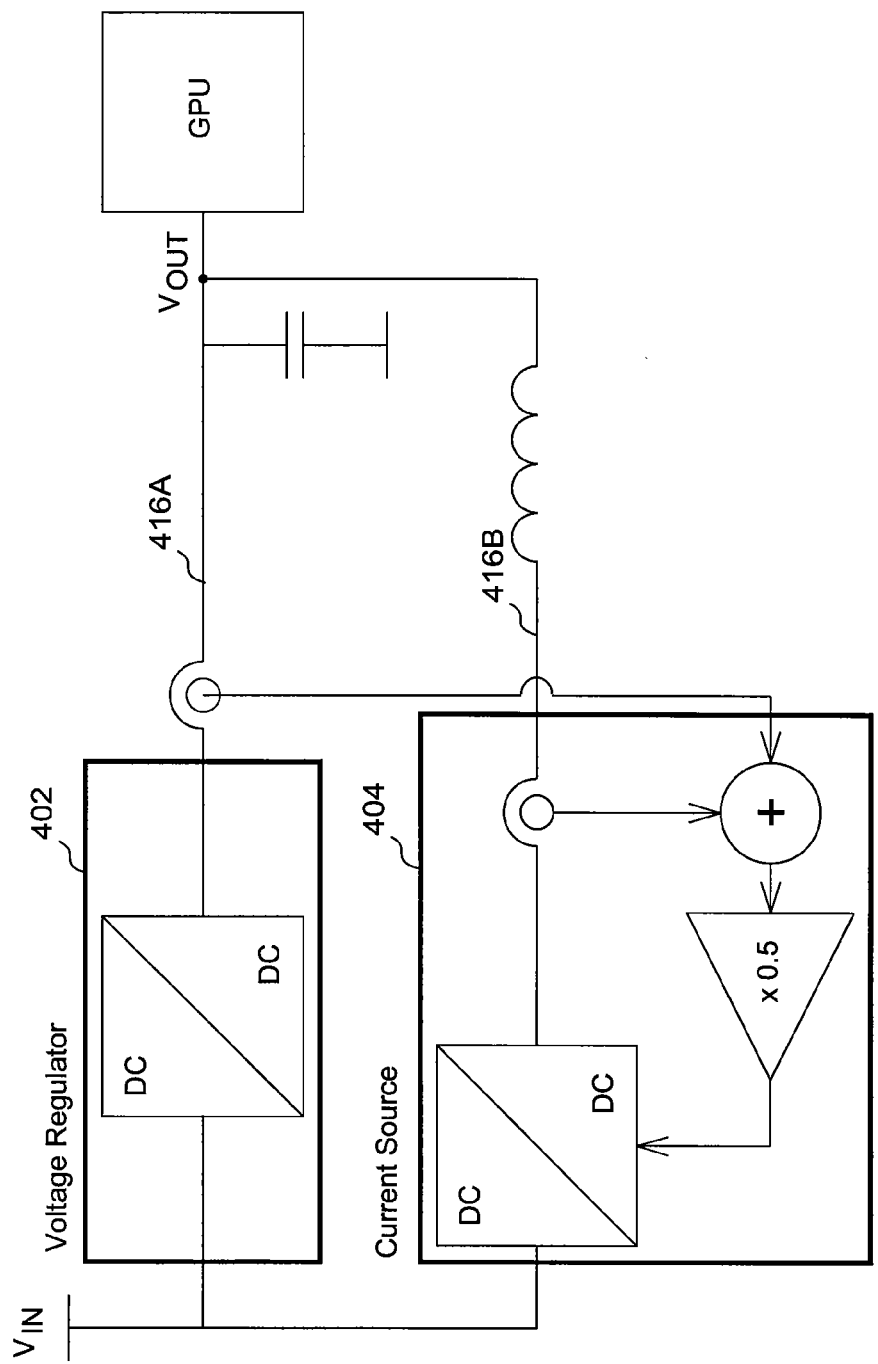
FIG. 4A is a conceptual diagram of a dual-mode power supply implemented as a voltage regulator and current source, according to one embodiment of the invention.

FIG. 4A is a conceptual diagram of a dual-mode power supply implemented as a voltage regulator 402 and current source 404, according to one embodiment of the invention. As shown, the voltage regulator 402 is a DC-to-DC voltage regulator, and may include multiple phases. Each phase of the voltage regulator 402 may be of a fast-switching topology. In contrast, the current source 404, which is configured with feedback from both current paths 416A, 416B, may include multiple phases having a slow-switching, but high-efficiency topology. As shown, the current feedback from each current path 416A, 416B is summed and multiplied by a factor of 0.5. In this embodiment, the current source is configured to provide half of the total output current. As described above, the leakage current may be approximately half of the total current. This leakage current may be maintained by the current source 404, whereas dynamic portions of the total output current may be maintained by the voltage regulator 402.

Figure 4B:
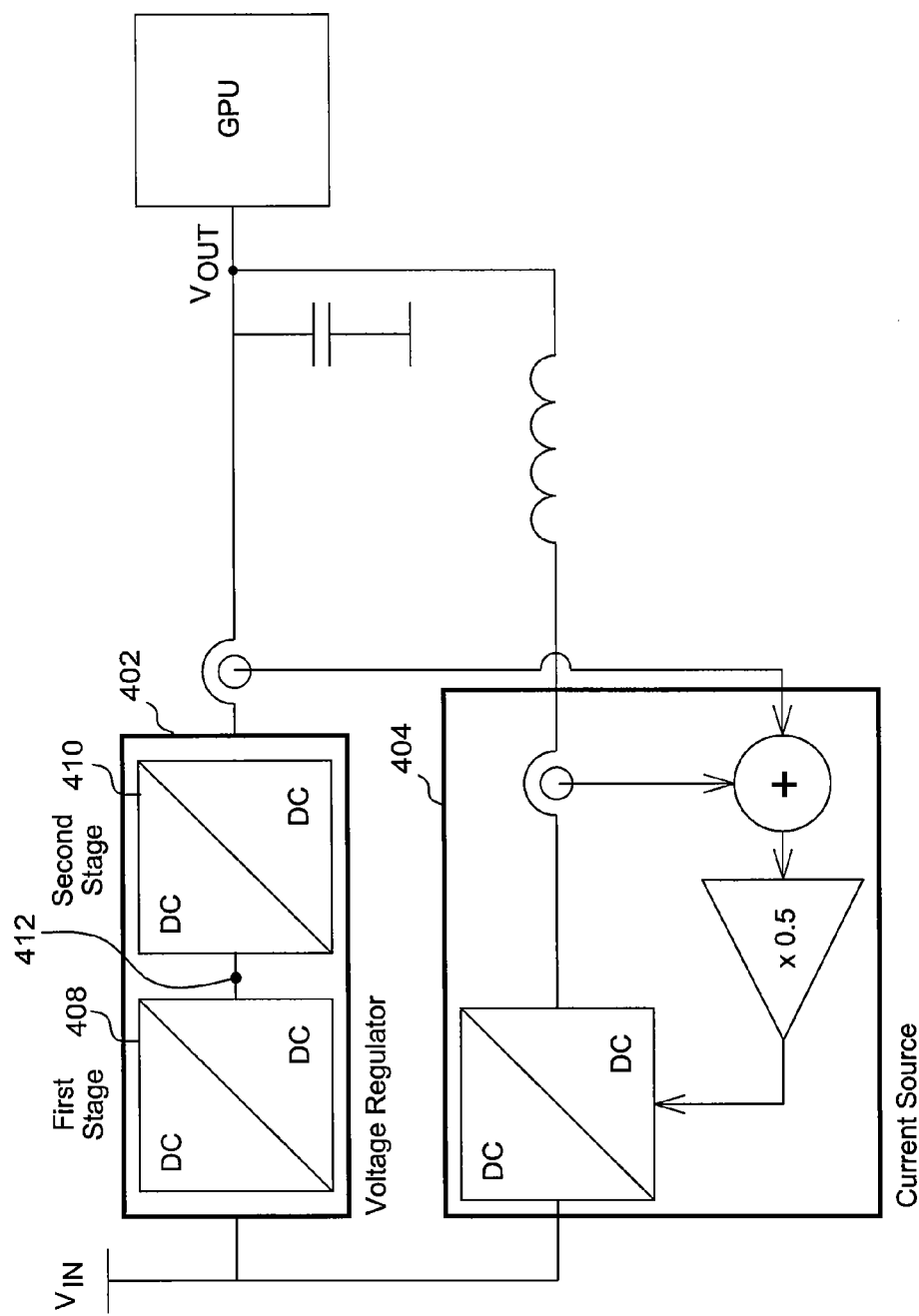
FIG. 4B is a conceptual diagram of a dual-mode power supply implemented as a two-stage voltage regulator and current source, according to one embodiment of the invention.

FIG. 4B is a conceptual diagram of a dual-mode power supply implemented as a voltage regulator 402 and current source 404, according to one embodiment of the invention. The voltage regulator 402 may be implemented using a first stage 408 and a second stage 410. In one embodiment, the first stage 408 reduces the input voltage $V_{IN}$ from 12V to an intermediate voltage 412, e.g., 5V. The second stage 410 reduces the intermediate voltage 412 to the output voltage $V_{OUT}$. In one embodiment, the first stage 408 includes a slow-switching topology and the second stage 410 includes a fast-switching topology. As described above, a two-stage design allows for better efficiency because the voltage drop across the less efficient second stage 410 ($V_{OUT}$ less intermediate voltage 412) is reduced. Furthermore, the inherent problem with two-stage designs of requiring all of the current to be converted at both stages 408, 410 is mitigated because in a dual-mode power supply, the voltage regulator 402 is converting only a portion of the total output current (e.g., the dynamic portion).

Figure 5A:
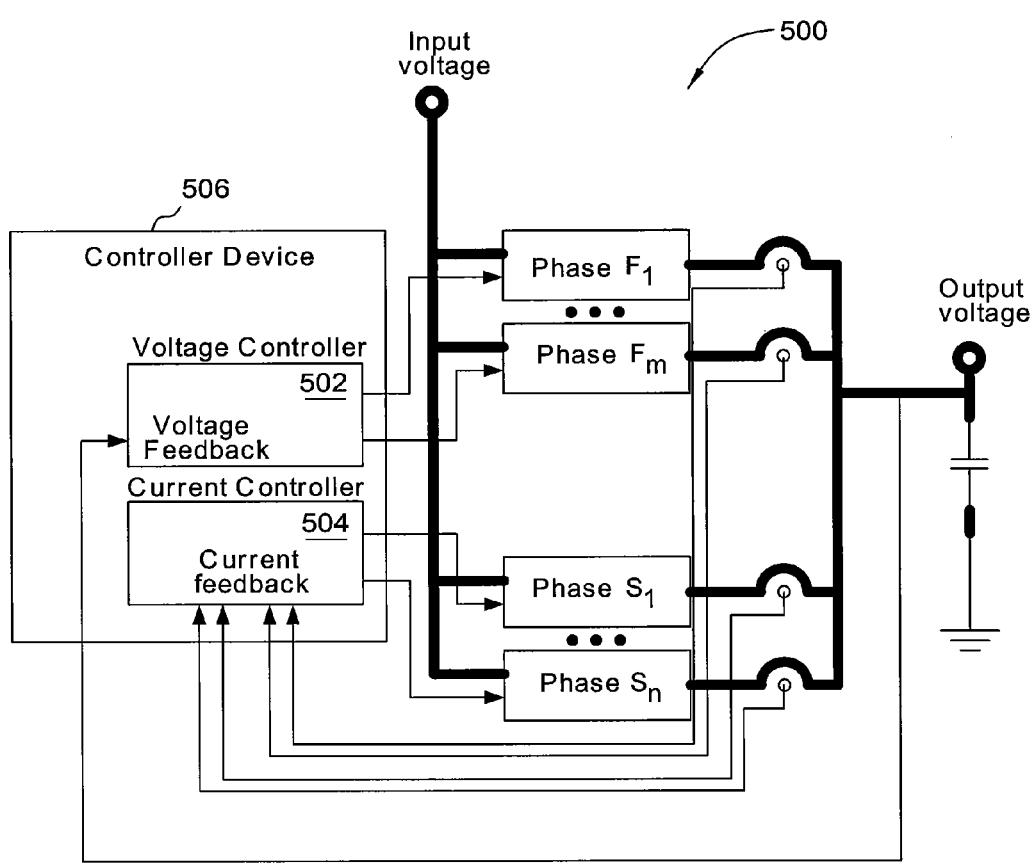
FIG. 5A is a conceptual diagram of a dual-mode power supply including a voltage controller and a current controller, according to one embodiment of the invention.

FIG. 5A is a conceptual diagram of a dual-mode power supply 500 including a voltage controller 502 and a current controller 504, according to one embodiment of the invention. As shown, the voltage controller 502 receives feedback from the output voltage and controls fast-switching phases $F_1$ to $F_m$, where m is the number of fast-switching phases. The current controller 504 receives feedback from each fast-switching phase $F_1$ to $F_m$ and each slow-switching phase $S_1$ to $S_n$, where n is the number of slow-switching phases, and controls slow-switching phases $S_1$ to $S_n$. In one embodiment, the voltage controller 502 and the current controller 504 are included in a single controller device 506. Implementing the controllers 502, 504 in a single device may allow for additional features to be implemented, including power on reset, error protection, and advanced dynamic requirements. In alternative embodiments, the voltage controller 502 and the current controller 504 are implemented as separate devices.

As described above, the dual-mode power supply 500 may be configured such that the static leakage current is generated with high efficiency, but relatively slow-switching (slow transient response) phases $S_1$ to $S_n$, while the dynamic part of the output current may be generated with a high-switching (fast transient response) phases $F_1$ to $F_m$. In one embodiment n=m, and half of the phases would provide the static current and half of the phases provide the dynamic current. In alternative embodiments, m and n are unequal based on the amount of the total current that is dynamic relative to amount of the total current that is static. Additionally, each of the phases $F_1$ to $F_m$ and $S_1$ to $S_n$ may be configured with a different topology. Some phases may be single-stage, while others may be dual-stage or multi-stage.

In one embodiment, the current controller 504 may include a control scheme for the static current where the control values are generated by measuring the total output current of the power supply, then dividing by the ratio desired. For example, current controller may be configured such that phases $S_1$ to $S_n$ provide half of the total output current. The voltage controller 502 could be, but is not limited to, a fast-switching, high transient response, very non-linear, voltage mode regulator. The control values generated by the voltage controller 502 may be used to set the desired output voltage.

Figure 5B:
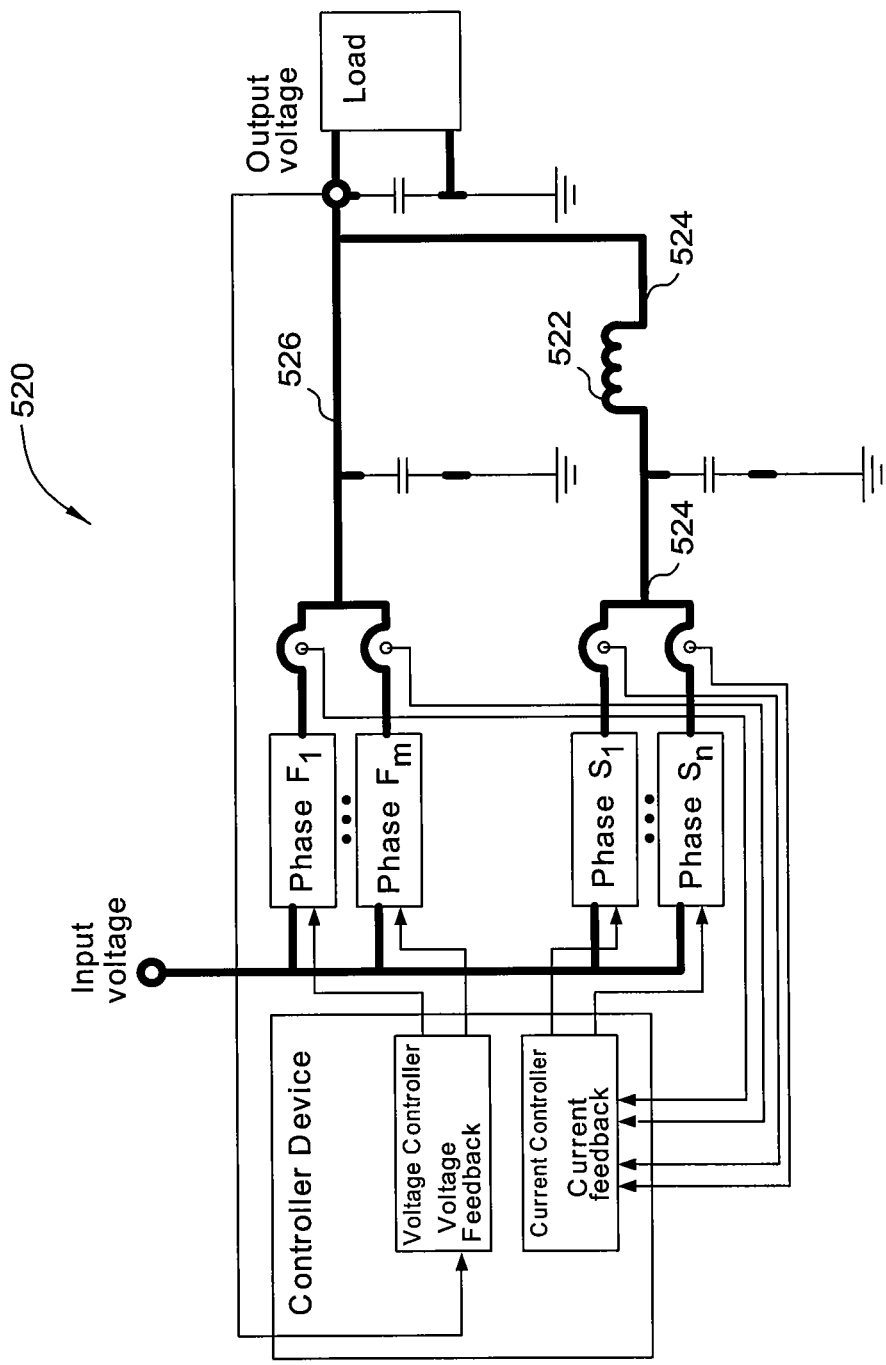
FIG. 5B is a conceptual diagram of a dual-mode power supply including an inductive path, according to one embodiment of the invention.

FIG. 5B is a conceptual diagram of a dual-mode power supply 520 including an inductive path 524, according to one embodiment of the invention. As shown, the dual-mode power supply 520 may include an inductor 522 between phases $S_1$ to $S_n$ and the load. As described above, an advantage of the dual-mode design is that the slow transient response current (that travels along the inductive path 524) could use a different current path to provide power to the load than the path 526 followed by the fast transient response current. Since the slow transient response portion of the power supply is of lower frequency, the inductive path 524 having a higher inductance may be implemented for that part of the power supply, while still maintaining a low impedance path 526 for the dynamic currents.

Figure 5C:
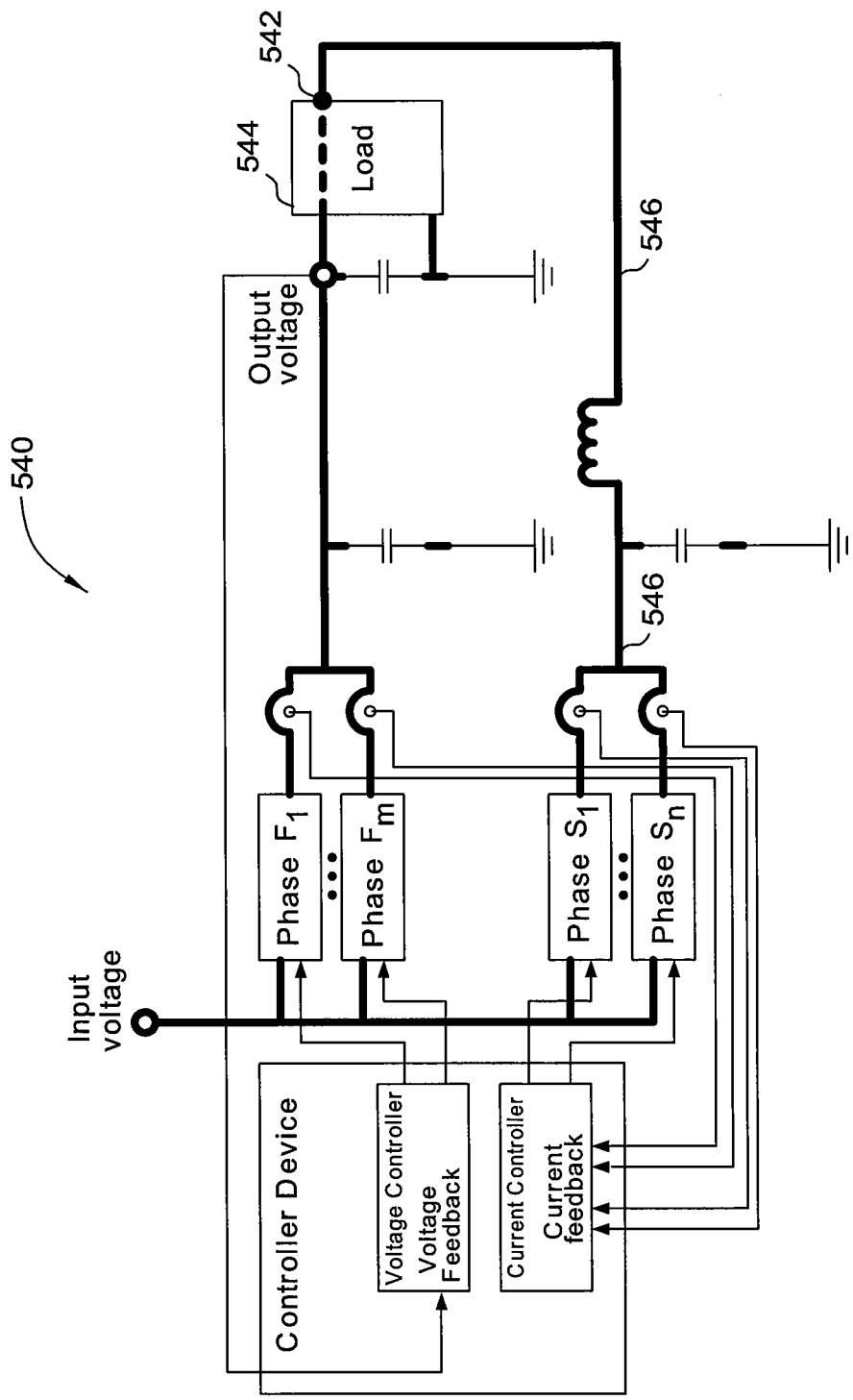
FIG. 5C is a conceptual diagram of a dual-mode power supply including an inductive path that provides power to the top side of the package, according to one embodiment of the invention.

FIG. 5C is a conceptual diagram of a dual-mode power supply 540 including an inductive path 546 provided from the top side 542 of the GPU 544, according to one embodiment of the invention. As previously described herein, the inductance of the current path 546 from phases $S_1$ to $S_n$ is not of particular importance because those currents are slow-changing. Therefore, as long as the resistance is low, the current path may be a copper wire soldered from the power supply (not shown) to the top side 542 of the GPU 544. Using a wire in this fashion addresses the problem of transporting a large amount of current (e.g., 250 A) to the GPU. The copper wire current path 546 be slightly longer than a conventional current path through the PCB, and the copper wire may rise off the PCB, e.g., away from the ground plane. Being raised off the PCB increases the internal inductance of this current path 546. However, since inductance is not important for slow-changing current, as long as the connections to the power supply and to the GPU are robust, the resistance should be relatively small, enabling efficiency to be maintained.

Figure 6:
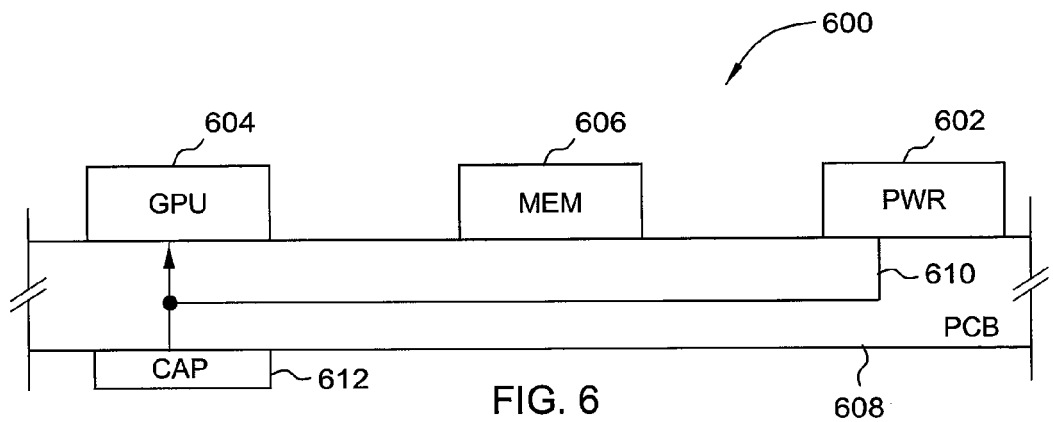
FIG. 6 is a cross-sectional view of an add-in card that includes a GPU, according to the prior art.

FIG. 6 is a cross-sectional view of a prior art add-in 600 card with a GPU 604. As shown, the add-in card 600 includes a power supply 602, the GPU 604, memory 606, and capacitors 612 disposed on a PCB 608. In conventional systems, all of the current, including both dynamic current and static/leakage current is supplied through one or more copper layers of the PCB 608 via current path 610. As described above, this power transport technique is difficult to implement with the ever-increasing current levels required for GPUs, now exceeding 250 A.

Figure 7A:
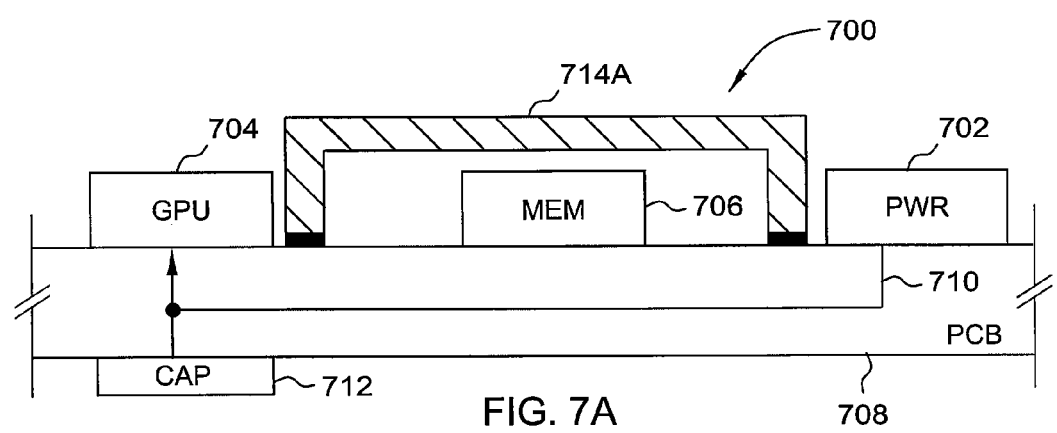
FIG. 7A is a cross-sectional view of an add-in card with a GPU including an alternate current path for static current, according to one embodiment of the invention.

FIG. 7A is a cross-sectional view of an add-in card 700 with a GPU 704 including an alternate current path 714A for static current, according to one embodiment of the invention. As shown, the add-in card 700 includes a power supply 702, the GPU 704, memory 706, and capacitors 712 disposed on a PCB 708. In one embodiment, the power supply 702 is implemented as a dual-mode power supply similar to that shown in FIG. 5B. Fast-switching phases may supply the dynamic portions of the current via current path 710 and the slow-switching phases may supply the static/leakage current via copper wire 714A. As shown, the copper wire 714A "jumps" over the memory 706 and provides an alternate current path to the GPU 704. As described above, such a current path would have a higher inductance because the copper wire 714A is elevated relative to the PCB. However, having a higher inductance path 714A for the slow transient portions of the current is not detrimental because that current is slow changing.

Figure 7B:
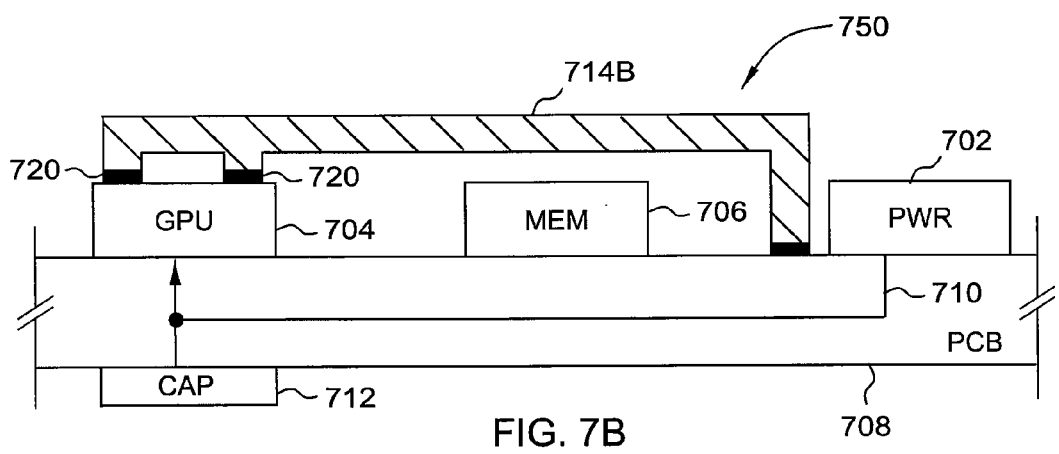
FIG. 7B is a cross-sectional view of an add-in card with a GPU including an alternate current path for static current that is connected to the top side of the GPU, according to one embodiment of the invention.

FIG. 7B is a cross-sectional view of an add-in card 750 with a GPU 704 including an alternate current path 714B for static current that is connected to the top side of the GPU 704, according to one embodiment of the invention. As described in FIG. 5C, the static/leakage current may be provided from the top side of the GPU 704. One or more contacts 720 may be included connecting copper wire 714B to the GPU 704.

Figure 8:
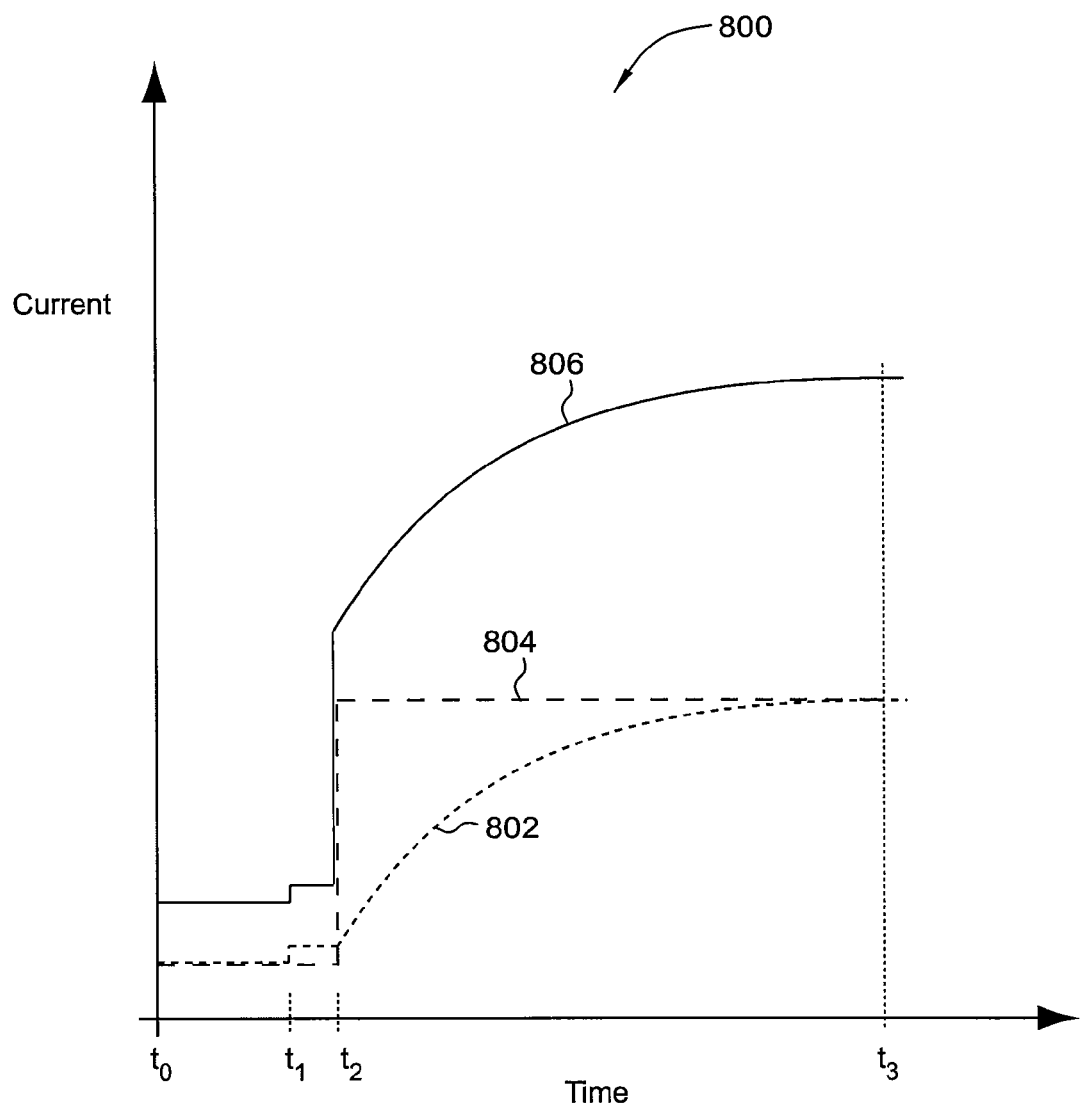
FIG. 8 is a diagram that plots current over time during a load step event, according to one embodiment of the invention.

FIG. 8 is a diagram that plots current over time during a load step event, according to one embodiment of the invention. As shown, path 802 illustrates how the slow-changing current changes over time, and path 804 illustrates how the fast-changing current changes over time. Path 806 is the sum of paths 802 and 804 and illustrates the total output current. As described above, a dual-mode power supply may be implemented such that a portion of the total output current is provided by fast-switching phases and the remainder of the total output current is provided by slow-switching phases. In the example shown in FIG. 8, the dual mode power supply is configured such that half of the current is provided by each of the fast-switching and the slow-switching portion. For example, at time $t_0$, a user of a computing device is performing tasks that are not GPU-intensive, e.g., browsing the web. The total output current at time $t_0$ is relatively low because the GPU is running at low power. As shown, each of the fast-switching and slow-switching portions of the power supply are supplying half of the total output current.

At time $t_1$, the user may start a 3D game, or some other GPU-intensive task. The power supply steps up the voltage, so the current increases right away. Once the voltage is stable, at time $t_2$, the GPU increases its clocks. The dynamic current provided by the fast-switching portion of the power supply increases very rapidly, as illustrated by path 804. The static/leakage current provided by the slow-switching portion of the power supply increases slowly, as illustrated by path 802. Summing these currents results in the total output current, as illustrated by path 806.

When comparing the timing diagram shown in FIG. 8 to a prior art power supply, the total output current path 806 would look approximately the same. As described, prior art systems use fast-switching phases to convert all of the total output current. However, because approximately half of the current that is supplied by the power supply is slow-changing (e.g., static/leakage current), there is no need to convert this slow-changing current using a fast-switching topology. Prior art systems are significantly less efficient, compared to a dual-mode power supply, as described herein. Additionally, a power supply that has a fast transient response costs approximately twice as much in silicon, compared to a power supply that has a slow transient response.

Advantageously, embodiments of the invention provide a more efficient power supply design that converts part of the total power supply output current using a fast transient response portion of the power supply and converts the remainder of the total current using a slow transient response portion of the power supply. Embodiments of the invention are especially beneficial when the load can be separated into low and high transient components. Similarly, such a dual-mode power supply is advantageous for any kind of load requiring a substantial amount of slow transient current. Additionally, embodiments of the invention provide an alternate current path for transporting large amounts of current to a GPU that is surrounded by memory elements or other electrical components or interfaces, while maintaining the efficiency of the overall current path.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A power supply connected to an electrical load and configured to supply an output voltage to the electrical load, the power supply comprising:

a first portion having a fast transient response topology and configured to supply a first part of an output current to the electrical load, wherein the first portion is capable of increasing the first part of the output current based on a load step event and decreasing the first part of the output current based on a load release event, and wherein a first current path carries current from the first portion to the electrical load; and a second portion having a slow transient response topology and configured to supply a second part of the output current to the electrical load such that the second part of the output current does not increase or decrease as fast as the first part of the output current, and wherein a second current path carries current from the second portion to the electrical load, wherein the first current path has a lower impedance than the second current path, and the second current path has a lower resistance than the first current path, and wherein the second current path comprises a copper wire connected to the second portion and the electrical load such that an internal inductance of the second current path is derived from the copper wire being elevated relative to a printed circuit board to which the power supply and electrical load are connected.

2. The power supply of claim 1, wherein the first portion includes a first plurality of regulator phases configured to have a fast-switching topology, and wherein the second portion includes a second plurality of regulator phases configured to have a slow-switching topology.

3. The power supply of claim 2, wherein at least one of the regulator phases included in the first plurality of regulator phases is configured with a two stage design.

4. The power supply of claim 3, wherein a first stage of the at least one regulator phase is configured with a slow-switching topology and a second stage of the at least one regulator phase is configured with a fast-switching topology.

5. The power supply of claim 1, wherein the first portion comprises a voltage regulator, and the second portion comprises a current source.

6. The power supply of claim 5, wherein the voltage regulator includes a voltage controller that receives an output voltage as a feedback voltage.

7. The power supply of claim 5, wherein the current source includes a multiplier that is configured to receive a current as feedback current from each of the first and second portions and multiply the feedback current to enable the current source to provide a corresponding fraction of the output current.

8. The power supply of claim 1, wherein the electrical load is a graphics processing unit.

9. An add-in card configured to be inserted into a computing device, the add-in card comprising:

a graphics processing unit (GPU) disposed on a printed circuit board (PCB) and configured to perform graphics processing operations;

a memory unit disposed on the PCB and connected to the GPU; and a power supply disposed on the PCB and connected to the GPU, including:

a first portion having a fast transient response topology and configured to supply a first part of an output current to the GPU, wherein the first portion is capable of increasing the first part of the output current based on a load step event and decreasing the first part of the output current based on a load release event, and wherein a first current path carries current from the first portion to the GPU; and a second portion having a slow transient response topology and configured to supply a second part of the output current to the GPU such that the second part of the output current does not increase or decrease as fast as the first part of the output current, and wherein a second current path carries current from the second portion to the GPU, wherein the first current path has a lower impedance than the second current path, and the second current path has a lower resistance than the first current path, and wherein the second current path comprises a copper wire connected to the second portion and the GPU and has an internal inductance derived from the copper wire being elevated relative to the PCB.

10. The add-in card of claim 9, wherein the first portion includes a first plurality of regulator phases configured to have a fast-switching topology, and wherein the second portion includes a second plurality of regulator phases configured to have a slow-switching topology.

11. The add-in card of claim 10, wherein at least one of the regulator phases included in the first plurality of regulator phases is configured with a two stage design.

12. The add-in card of claim 11, wherein a first stage of the at least one regulator phase is configured with a slow-switching topology and a second stage of the at least one regulator phase is configured with a fast-switching topology.

13. The add-in card of claim 9, wherein the first portion comprises a voltage regulator, and the second portion comprises a current source.

14. The add-in card of claim 13, wherein the voltage regulator includes a voltage controller that receives an output voltage as a feedback voltage.

15. The add-in card of claim 13, wherein the current source includes a multiplier that is configured to receive a current as feedback current from each of the first and second portions and multiply the feedback current to enable the current source to provide a corresponding fraction of the output current.

16. The add-in card of claim 9, wherein the copper wire is elevated by an amount necessary for the copper wire to be disposed above an electrical component connected to the PCB.

17. The add-in card of claim 16, wherein the electrical component is the memory unit, the copper wire is connected at a first end to the PCB between the power supply and a first side of the memory unit, and the copper wire is connected at a second end to the PCB on a second side of the memory unit.

18. The add-in card of claim 16, wherein the electrical component is the memory unit, the copper wire is connected at a first end to the PCB between the power supply and a first side of the memory unit, and the copper wire is connected at a second end directly to a top side of the GPU, which is disposed on a second side of the memory unit.

* * * * *